United States Patent [19]

Mould

[11] Patent Number: 5,025,255
[45] Date of Patent: Jun. 18, 1991

[54] SECURE KEYBOARD WITH RANDOM ORDER OF KEY INTERROGATION

[75] Inventor: David Mould, Turners Hill, United Kingdom

[73] Assignee: H. Bollmann Manufacturers Limited, West Sussex, England

[21] Appl. No.: 407,315

[22] Filed: Sep. 14, 1989

[30] Foreign Application Priority Data

Sep. 22, 1988 [GB] United Kingdom ................. 8822296

[51] Int. Cl.$^5$ ...................... H03K 17/94; H03M 11/20
[52] U.S. Cl. ......................................... 341/26; 341/22; 380/52
[58] Field of Search ...................... 341/26, 22; 380/52; 379/368; 340/825.31

[56] References Cited

U.S. PATENT DOCUMENTS 4,479,112 10/1984 Hirsch ............................ 340/825.31
4,926,173 5/1990 Frielink ............................. 380/52 X Primary Examiner—Palmer C. DeMeo
Assistant Examiner—Michael Horabik
Attorney, Agent, or Firm—Nixon & Vanderhye

[57] ABSTRACT

A keyboard arrangement, such as for a computer or the like, has a number of keys arranged in rows and columns. The keys of each row are associated with a respective conductor and the keys of each column are associated with a respective conductor. Each key, when depressed, interconnects the two conductors. An interrogator is provided to interrogate the rows respectively by transmitting pulses to the rows and to interrogate the columns, to determine the presence of a transmitted pulse. The interrogator is adapted to interrogate the rows in a random or quasi-random order during successive cycles of operation.

15 Claims, 2 Drawing Sheets

SECURE KEYBOARD WITH RANDOM ORDER OF KEY INTERROGATION

BACKGROUND OF THE INVENTION

1. Field of the Invention

The present invention relates to a keyboard arrangement and more particularly relates to a keyboard arrangement of the alpha-numeric type as frequently utilized in connection with computers, word processors and the like. However, it is to be appreciated that the invention is not restricted to use in such circumstances and may find other applications.

2. Discussion of the Prior Art

FIG. 1 is a diagrammatic view of part of a conventional electronic alpha-numeric keyboard.

Although the keys on the keyboard may be provided in staggered rows, or in some other array, topologically the keys may be considered to constitute a regular array of rows and columns. In the presently described typical keyboard a transverse conductor, such as the conductor 1 or 2 is associated with each row of keys, and a vertical conductor, such as the conductors 3 and 4 are associated with each column of keys. Whenever a key is depressed the key serves to connect electrically the conductor associated with the row of keys in which the key is situated with the conductor associated with the column in which the key is situated. Thus, for example, if the key 5 is pressed the conductor 2 is electrically connected to the conductor 4.

Only part of the conventional keyboard is illustrated in FIG. 1, sufficient to illustrate the arrangement.

In order to determine which key has been pressed at any instant a microprocessor 6 is provided which controls a row interrogator 7. The row interrogator 7 supplies sequential pulses, such as the pulses 9 to respective conductors associated with the rows of keys. Thus, for example, the conductor 1 will receive an initial pulse during a cycle of operation, and the conductor 2 will receive a subsequent, later pulse. Further pulses are applied in turn, after appropriate brief time delays, to each of the conductors associated with the respective rows of keys. A diode may be integrated in each key to allow any number of keys to be depressed and still be properly detected.

At any instant only one key is depressed, and thus one conductor associated with a row of keys is connected to one conductor associated with a column of keys. As mentioned if the key 5 is depressed the conductor 2 is connected to the conductor 4. Thus, when the pulse 9 from the row interrogator is fed to the key 5 an output pulse is provided on the conductor 4. Each of the conductors 3,4 etc. associated with a column of keys is associated with a respective column latch 10. When such a latch receives a pulse the latch enters a latched state. A column latch interrogator 11 is provided which, after each pulse 9 has been supplied from the row interrogator, interrogates the column latches 10 to ascertain if a column latch has been latched by receipt of a pulse. The column latch interrogator is controlled by the microprocessor, and resets the latches it interrogates. When the column latch interrogator determines that a latch 10 has been latched, the appropriate information is relayed to the microprocessor, and the microprocessor can then act upon the information provided to generate a signal representative of the particular key that was depressed during the interrogation sequence. The interrogation sequence can then repeat.

One problem that can be experienced with an arrangement as described is that as the microprocessor interrogates the rows, with the row interrogator as described, electro-magnetic radiation is emitted by the keyboard corresponding to the pulses supplied to the rows. The nature of this emitted radiation varies when a row is interrogated which has a key depressed. Also the nature of the emitted radiation is such that the radiation differs depending upon precisely which key in the row is depressed.

Consequently, it is possible for a person provided with appropriate "eavesdropping" equipment to detect the radiation emitted by the keyboard, and by processing that detected radiation appropriately, to determine which keys have been pressed, and in which order. Thus, effectively, an appropriate "eavesdropping" device can effectively read the information that is entered through the keyboard.

SUMMARY OF THE INVENTION

In certain situations it is very desirable to have a "secure" keyboard in which it is not possible to determine, by "eavesdropping" techniques as described above, which keys have been pressed. The present invention seeks to provide such a keyboard.

According to this invention there is provided a keyboard arrangement, said keyboard arrangement comprising a plurality of keys arranged in rows and columns, or a topological equivalent thereof, rows of keys being associated with respective conductors and columns of keys being associated with respective conductors, each key acting, on depression thereof, to interconnect the conductors associated with the row and column in which the key is located, there being means to interrogate the rows respectively by transmitting pulses to the rows (or columns), and there being means to interrogate the columns (or rows) to determine the presence of a transmitted pulse on any one column (or row), the row (or column) interrogating means being adapted to interrogate the rows (or columns) in a random or quasi-random order during successive cycles of operation.

Preferably a random number generator is provided to determine the random order of row (or column) interrogation.

Conveniently the random number generator generates a number identifying a row (or column), and memory means are provided adapted to store signals representative of rows (or columns) which have been scanned in any cycle of operation, the number generated by the random number generator being compared with the numbers present in the said memory, the identified row (or column) being interrogated if the number generated by the random number generator is not present in the said memory.

Preferably a counter is provided to count the number of rows (or columns) interrogated, the apparatus being adapted to continue interrogating rows (or columns) until the row (or column) interrogation counter contains such a number that is indicative of the fact that all the rows (or columns) have been interrogated, the apparatus being adapted then to commence a fresh cycle of operation.

BRIEF DESCRIPTION OF THE DRAWINGS

Some details of the present invention may be more readily appreciated by reference to the drawings wherein.

DETAILED DESCRIPTION OF THE INVENTION

Figure 1:
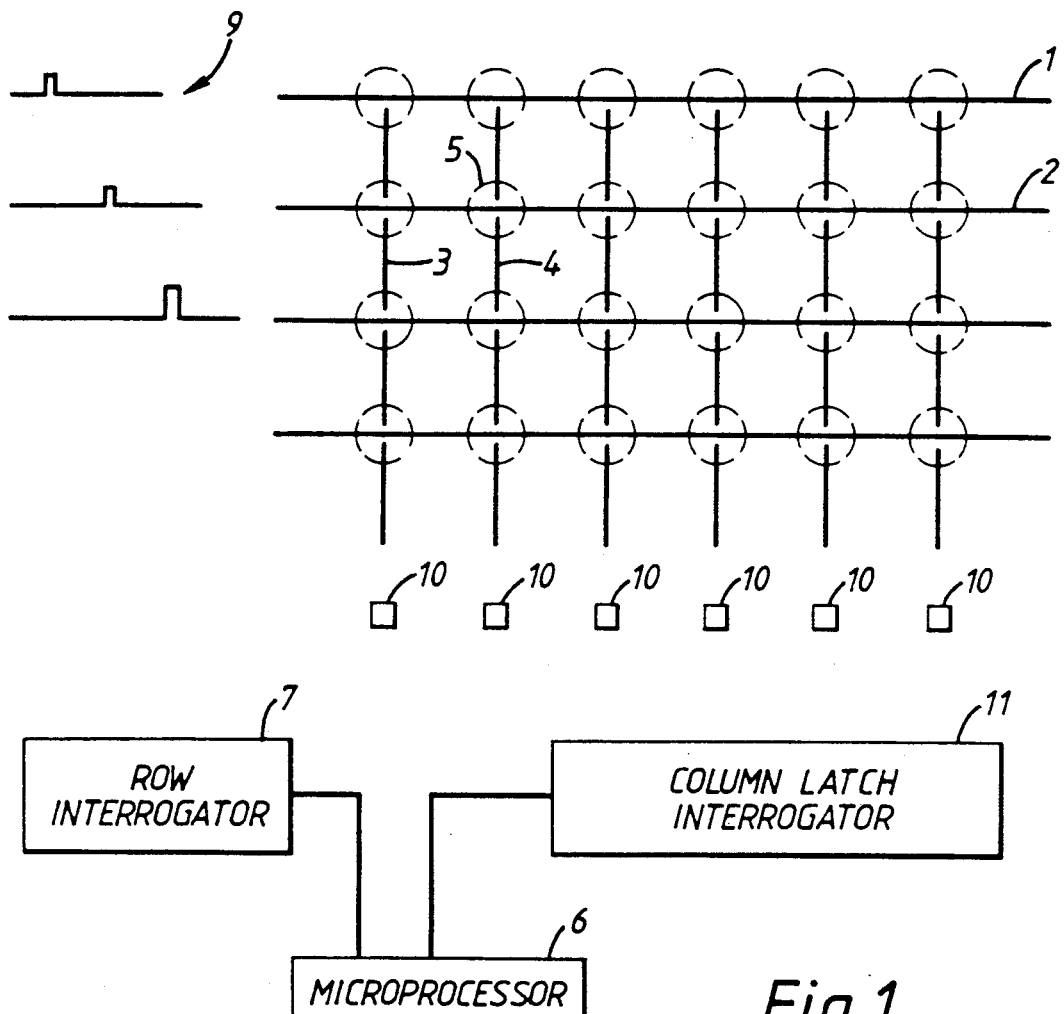
FIG. 1 is a part block diagram illustrating a prior art keyboard.
Figure 2:
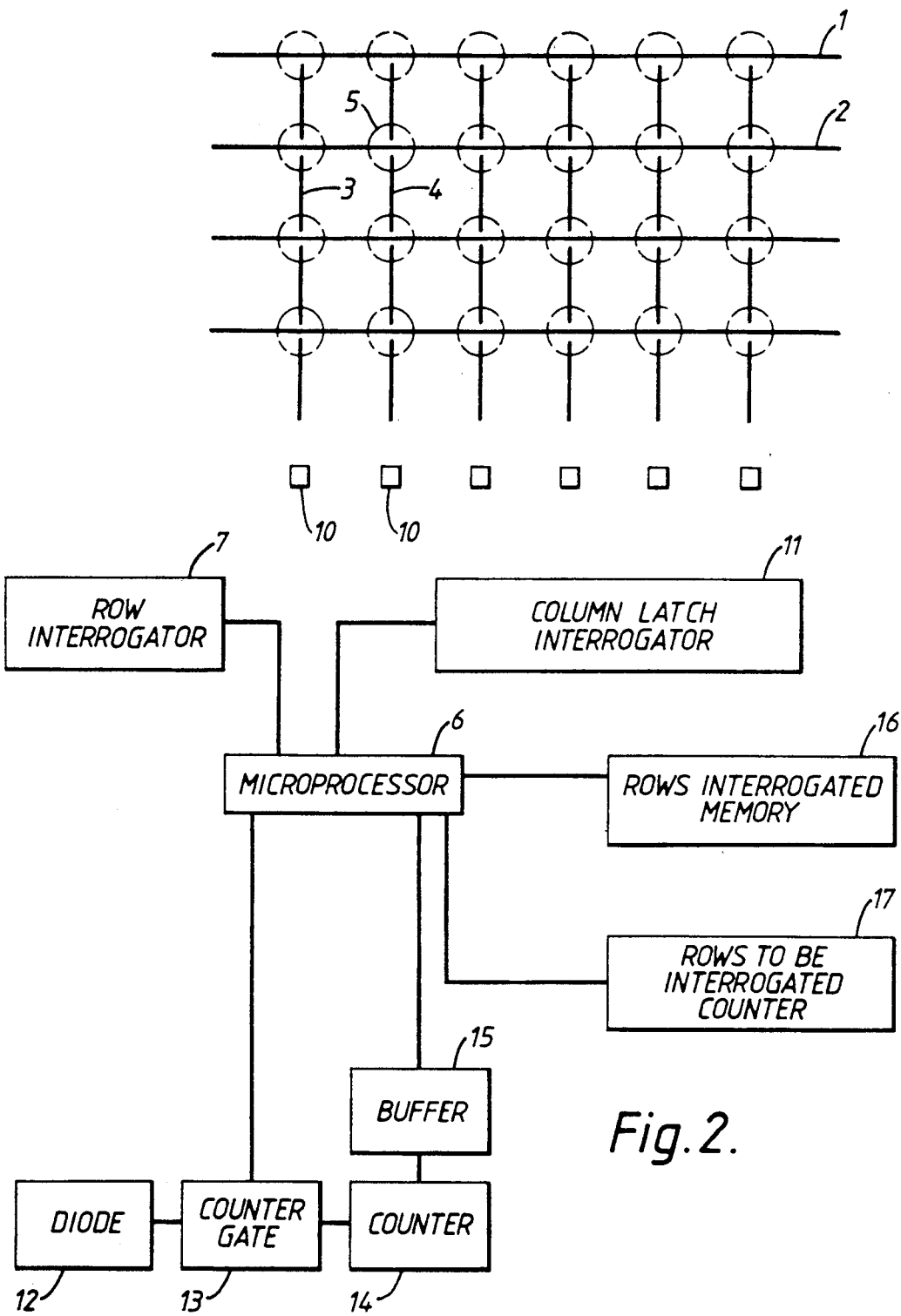
FIG. 2 is a part block diagram illustrating one embodiment of the present invention.

In order that the invention may be more readily understood, and so that further features thereof may be appreciated, the invention will now be described, by way of example with reference to FIG. 2 of the accompanying drawings which is a part diagrammatic, part block diagram illustrating one exemplary embodiment of the invention.

The illustrated exemplary embodiment of the invention incorporates a keyboard having, as described above, rows of conductors 1,2, etc. which intersect with columns of conductors 3,4, etc., the conductor of one row and the conductor of one column being interconnected when a key, such as the key 5 is depressed.

A microprocessor 6 is provided which is associated with a row interrogator 7. Each column is associated with a column latch 10, and the column latches 10 are adapted to be interrogated by a column latch interrogator 11, generally as described above.

In the embodiment of the invention, however, the microprocessor 6 does not control the row interrogator to interrogate the rows sequentially, but instead the microprocessor controls the row interrogator to interrogate the rows in a purely random fashion.

Associated with the microprocessor is a random number generator. In this embodiment of the invention the random number generator comprises a diode 12 which generates "noise" or pulses of unpredictable length. The output of the diode is fed to an enabling input of a counter-gate 13. Thus, whenever the diode is producing an output pulse, the counter-gate is open, enabling a free running six-bit counter 14 to count. The output of the counter is fed, via tristate buffers 15, to the microprocessor. The microprocessor is also associated with a rows interrogated memory 16 and a rows to be interrogated counter 17.

The microprocessor is connected directly to the counter-gate in such a way that it can disable the counter 14, overriding any signals supplied to the counter-gate from the diode 12.

At the commencement of a cycle of operation of the keyboard, the diode 12 generates pulses of random length, which open and close the counter-gate 13, and thus the counter counts, stopping and starting as the gate 13 is opened and closed. Thus, at any particular instant, a totally random number will be present on the counter. The microprocessor reads the count in the counter. During this particular procedural step the microprocessor closes the counter-gate 13 so that the count present on the counter is effectively "frozen". The random number generated by the counter will identify a particular row of keys. The row interrogator then interrogates that particular row or line of keys. A number identifying the line or row of keys interrogated is entered into the rows interrogated memory. The rows to be interrogated counter, which at the beginning of the described cycle of operation contains a count equal to the number of rows to be interrogated, has its count decremented by one.

When the row has been interrogated, and the column latch interrogator has interrogated the column latches, the microprocessor removes the signal disabling the counter-gate 13, and the counter again counts during periods of time that the counter-gate 13 is opened by the diode 12. After a pre-determined period of time the microprocessor reads the number present in the rows to be interrogated counter. If the number is one or more the microprocessor again reads the random number constituted by the count present on the counter 14, disabling the counter-gate 13 and reading the number on the counter 14, which is representative of a row of keys. The microprocessor compares this number with the number or numbers stored in the rows interrogated memory, in order to check if this particular row has been interrogated previously. If it has not been interrogated previously, then the microprocessor causes the row interrogator 7 to interrogate that particular row. The column latch interrogator then interrogates the column latches 10. Again the count on the rows to be interrogated counter is decremented by one.

The described procedure is then repeated, with the microprocessor again checking the count present in the rows to be interrogated counter, and if that count is one or more, the microprocessor again reads the count present in the counter, disabling the counter in the meanwhile with the counter-gate 13, compares the read number with the number or numbers stored in the rows interrogated memory, and if the number represents a row which has not been interrogated, the row is then interrogated. Again the count on the rows to be interrogated counter is decremented by one.

When the count present in the rows to be interrogated counter has reduced to zero, that is to say when all the rows have been interrogated, the microprocessor returns to its initial state and the described cycle of operation is repeated.

It will be appreciated that, whilst the invention has been described with reference to an embodiment in which rows are interrogated with applied pulses, and columns are associated with column latches, which are subsequently interrogated, the entire arrangement could be reversed, with the columns being interrogated, and the rows being provided with row latches which are subsequently interrogated.

It will furthermore be appreciated that, in utilizing an embodiment of the present invention, as described, the various rows will be interrogated, in each cycle of operation, in a random order. Thus, if a person is utilising "eavesdropping" equipment, it will not be possible for the person to determine which keys have been operated whilst the keyboard is in use.

Whilst the invention has been described with reference to one particular embodiment, in which a diode and an associated counter-gate and counter effectively constitute a random number generator, other embodiments of the invention are to be envisaged.

Instead of utilising a true random number generator, as described, a quasi-random number generator may be utilised, in which case the microprocessor will be associated with a memory that contains a large series of pre-determined random numbers. These random numbers will be utilized sequentially, instead of the random numbers generated by the diode, counter-gate and counter as described above. Provided that a large number of random numbers are contained within the memory, the effect will be the same as that described above, and thus the keyboard will still be "secure".

Alternatively the microprocessor may be associated with a memory having stored within it various sequences and orders in which the rows may be interrogated, and a random number may generate numbers representative of addresses within the memory. Thus, at the instant that the rows are to be interrogated, the microprocessor may stop the random number generator, and utilize the number generated by the random number generator to identify a particular sequence in which the rows are to be interrogated.

Such arrangements may obviate the necessity for the rows interrogated memory and the rows interrogated counter.

What is claimed is:

1. A keyboard arrangement comprising a plurality of keys arranged in rows and columns, said rows of keys being associated with a respective first set of conductors and said columns of keys being associated with a respective second set of conductors, each key acting, on depression thereof, to interconnect respective ones of said first and second sets of conductors associated with the row and column in which the key is located; means for interrogating said rows during each of a plurality of cycles of operation by transmitting pulses to said rows to determine the presence of a transmitted pulses on any one of said columns, the interrogating means being adapted to interrogate said rows and columns in a random or quasi-random order during successive cycles of operation.

2. An arrangement according to claim 1 wherein a random number generator is provided to determine the random order of row interrogation.

3. An arrangement according to claim 2 wherein the random number generator generates a number identifying a row, and memory means are provided adapted to store signals representative of rows which have been scanned in any cycle of operation, the number generated by the random number generator being compared with the numbers present in said memory, the identified row being interrogated if the number generated by the random number generator is not present in said memory.

4. An arrangement according to claim 1 wherein a counter is provided to count the number of rows interrogated, the apparatus being adapted to continue interrogating rows until the row interrogation counter contains such a number that is indicative that all rows have been interrogated, the apparatus being adapted to then commence a further cycle of operation.

5. A keyboard arrangement having a plurality of cycles of operation comprising:
    a plurality of keys arranged in a plurality of rows and a plurality of columns;
    first conductors associated with respective rows of keys;
    second conductors associated with respective columns of keys, whereby depression of any given key interconnects one each of said first and second conductors;
    a first interrogator for randomly interrogating one of said plurality of rows and said plurality of columns by transmitting pulses thereto during one cycle of operation;
    a second interrogator for interrogating the other of said plurality of rows and plurality of columns to determine the presence of one of said transmitted pulses in said other of said plurality of rows and plurality of columns.

6. The keyboard arrangement of claim 5 wherein said one of said plurality of rows and plurality of columns comprises said plurality of rows.

7. The keyboard arrangement of claim 5 wherein said one of said plurality of rows and plurality of columns comprises said plurality of columns.

8. The keyboard arrangement of claim 5 further comprising a random number generator for determining a random order of interrogation for said first interrogator during successive cycle of operation.

9. The keyboard arrangement of claim 8 wherein said random number generator generates a number identifying a row or column to be interrogated within one of said plurality of rows and plurality of columns, and wherein the keyboard arrangement further includes a memory device adapted to store signals representing said numbers of rows or columns within said one of said plurality of rows and plurality of columns interrogated by said first interrogator during each cycle of operation, the memory device including means for comparing the identifying number with numbers present in the memory, whereby the identified row or column is interrogated by the first interrogator if the identifying number is not present in the memory.

10. The keyboard arrangement of claim 9 further including a counter for counting the rows or columns within said one of said plurality of rows and columns interrogated by said first interrogator.

11. A method for securing a keyboard against electronic eavesdropping comprising the steps of:
    (a) providing a keyboard having a plurality of keys arranged in a plurality of rows and a plurality of columns, and wherein first conductors are associated with respective rows of keys, and second conductors are associated respective columns of keys, such that depression of any key interconnects one each of said first and second conductors as determined by key location;
    (b) interrogating one of said rows and columns of keys randomly by transmitting pulses through one of said first and second conductors associated with said one of said rows and columns, respectively, a depressed key in said one of said rows and columns causing a corresponding pulse to be transmitted in a respective one of said second and first conductors associated with a respective one of said columns and rows;
    (c) interrogating one of said plurality of columns and said plurality of rows of keys to determine the presence of said corresponding pulse to thereby identify said depressed key; and
    (d) relaying information regarding the identified key to a microprocessor.

12. The process of claim 11 wherein step (c) is carried out by providing one of a column and row latch for one of said plurality of columns and said plurality of rows, said columns and rows latch entering a latched state upon reception of one of said pulses, and interrogating said one of said plurality of column latches and said plurality of row latches to determine if a respective column and row latch has entered the latched state by receipt of said one of said pulses.

13. The process of claim 11 wherein step (b) is carried out by generating a random number identifying one of a row and column to be interrogated, providing a memory to store random numbers identifying said one row and column already interrogated, comparing the generated random number with the stored random numbers, and interrogating another one of said rows and columns if the generated random number is not present in the stored random numbers.

14. The process of claim 11 wherein steps (b) through (d) are repeated until all of said one of said plurality of rows and said plurality of columns have been interrogated.

15. The process of claim 11 wherein steps (b) through (d) comprise one cycle of operation, and wherein after all of said one of said plurality of rows and said plurality of columns have been interrogated, a new cycle of operation is commenced.

* * * * *